UNITED STATES PATENT OFFICE.

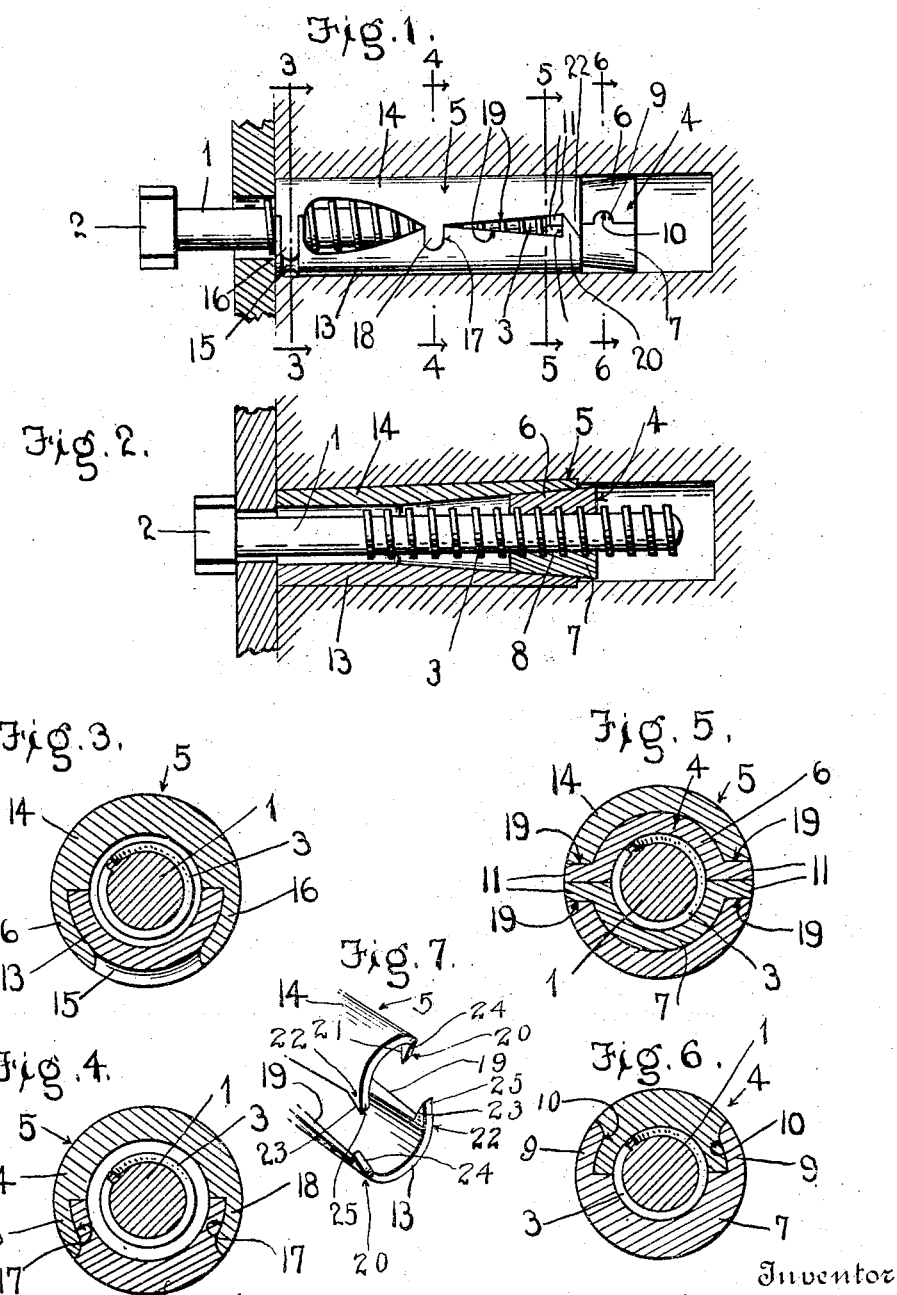

DWIGHT WILSON BENNETT, OF SOMERTON, PENNSYLVANIA, ASSIGNOR OF ONE-THIRD TO BENJAMIN VAN SANT, OF SOUTHAMPTON, PENNSYLVANIA.

EXPANSION-BOLT.

1,041,953.  Specification of Letters Patent.  Patented Oct. 22, 1912.

Application filed April 15, 1912. Serial No. 690,769.

*To all whom it may concern:*

Be it known that I, DWIGHT WILSON BENNETT, a citizen of the United States, residing at Somerton, in the county of Philadelphia and State of Pennsylvania, have invented certain new and useful Improvements in Expansion-Bolts; and I do declare the following to be a full, clear, and exact description of the invention, such as will enable others skilled in the art to which it appertains to make and use the same.

This invention is an expansion bolt; and its object is to so construct the parts that the movement of the nut will expand the casing by contact at three points with each section thereof.

A further object is to so construct the nut and casing that their parts will not become disconnected as the device is handled before it is put in place.

These and other objects are carried out by constructing the parts as hereinafter more fully described and claimed, and as shown in the drawings wherein—

Figure 1 is a side elevation of the bolt with its parts already inserted in the socket within which it is to be expanded, showing the screw in the act of being put into place. Fig. 2 is a central vertical longitudinal sectional view of all parts, showing their relative position after the screw has been tightened up. Figs. 3, 4, 5 and 6 are cross sectional views on the lines 3—3, 4—4, 5—5 and 6—6 of Fig. 1. Fig. 7 is a perspective detail of the inner ends of the casing members slightly separated.

In the drawings the numeral 1 designates a bolt having a head 2 at one end and a thread 3 extending from its other end toward the head. This bolt is adapted to be screwed into an expansion device consisting of a two-part nut 4 mounted movably within a two-part tubular casing 5. The nut consists of two similar semi-conical half-sections 6 and 7 whose inner faces are grooved longitudinally and threaded as at 8 to form the bore of the nut adapted to fit upon the threads 3 of the bolt. Said sections are held in alinement with each other by providing the section 7 with two projecting lugs 9 adapted to enter recesses 10 formed in the other section 6. In addition, each section of the nut is provided at its smaller end next its flat edge which contacts with the other section, with a radially projecting spur 11, and when the two sections are assembled the spurs on one lie against those on the other so that the smaller end of the conical nut has two diametrically opposite radial spurs as shown.

The two half-sections or members 13 and 14 of the casing are each semi-cylindrical in general contour, and are of like size and shape with the following exceptions: The member 13 has a groove 15 around its outer face near its outer end, and the member 14 has two pliable fingers 16 which are bent around the member 13 and into said groove, whereby the outer ends of the members are held together although they are permitted to yield slightly by reason of the pliability of the fingers. At about its mid-length the member 13 has two side recesses 17, and opposite thereto the member 14 has two additional pliable fingers 18 adapted to be bent into said recesses, whereby the centers of the members are held together but permitted to yield slightly as the pliability of these fingers will permit. From the mid-length of these members toward their inner ends their contiguous edges diverge slightly as shown at 19, and at its inner end the member 14 has a hook 20 at one side whose bill has a flat inner face 21 standing at right angles to the axial line of the casing, and a beveled outer face 24; and a hook 22 at the other side whose bill has an inner face 23 which is oblique to said axial line and an outer face 25 which is flat. Conversely the other member of the casing is provided with similar hooks oppositely disposed, with the result that the beveled outer face 24 of each hook 20 having a right-angular inner face normally contacts with the beveled inner face 23 of the hook on the other member, whereas the flat faces 25 of the two hooks 22 normally stand in line with the inner end of the casing.

The parts are assembled by placing the two nut-sections together, then bringing the two members of the casing together so that the spurs 11 on the nut stand between the diverging edges 19 and behind the right-angular bills 21, and finally bending the pliable fingers 16 and 18 into the groove 15 and the recesses 17. When so associated, it will be found that the lugs and recesses hold the nut sections together as one, the hooks 20 hold the nut in the casing, and the fingers hold the casing members together as one, and the device may be subjected to considerable rough usage without disassociating its parts. Hence it may be thrown into the tool box and carried to the point of use, and the inconvenience of having to assemble the parts is avoided.

The use of expansion bolts is well known. The bolt is passed through the casing and its threads engaged with those in the nut, the casing and nut having first been inserted into the socket within which they are to be expanded, and when the bolt is rotated with its head in contact with the outer edge of the casing, the conical nut is drawn into the inner end thereof and the same is forced to expand.

The advantages arising from the specific construction described above will now be apparent. As the conical nut travels into the inner end of the casing it contacts with the interior of the two members thereof, and simultaneously both prongs contact with the edges 19 thereof which converge toward the outer end of the casing—hence the nut expands the casing by contact at three points with each section thereof, and the result is that the members of the casing are spread apart with great force and this improved expansion bolt is therefore especially effective. Obviously the sizes and materials of parts are unimportant, and details may be altered to a considerable extent while yet retaining the essential features. For instance, other means than the pliable fingers may be employed for connecting the members of the casing; and for holding the nut in the inner end of the same, hooks of other shape might be utilized, or the right-angular hooks 20 employed without using the hooks 22 at all.

What is claimed as new is:

1. In an expansion bolt, the combination with a substantially tubular casing made in two members whose contiguous inner walls and edges diverge toward their inner ends; of a two-part nut conical on its exterior, each part having at its smaller end two radial prongs next its edge adapted to contact with the prongs on the companion part and to project through the space between and into contact with the edges of said members.

2. In an expansion bolt, the combination with a casing made in two members whose contiguous edges diverge toward their inner ends, a hook on one edge of each member projecting toward the other and having its inner face standing at right angles to the axis of the casing and its other face oblique thereto, and a second hook on the other edge of said member having its inner face oblique to match the oblique portion of the mating hook and its other face flat and flush with the end of the casing; of a nut having two diametrically opposite radial prongs at one end adapted to project through the space between the edges of said members and to stand normally in contact with the hook faces which stand at right angles to the axis of the casing.

In testimony whereof I have hereunto set my hand in presence of two subscribing witnesses.

DWIGHT WILSON BENNETT.

Witnesses:
 GEO. NEBEKER,
 REEVE HAMMELL.

---

Copies of this patent may be obtained for five cents each, by addressing the "Commissioner of Patents, Washington, D. C."